(12) United States Patent
Silvery et al.

(10) Patent No.: US 12,015,310 B2
(45) Date of Patent: Jun. 18, 2024

(54) ELECTRIC MACHINE WITH WINDING TEMPERATURE SENSOR

(71) Applicant: Schaeffler Technologies AG & Co. KG, Herzogenaurach (DE)

(72) Inventors: Christian Silvery, Walzbachtal (DE); Mike Czerlewitz, Bühl (DE); Matthias Kästle, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 331 days.

(21) Appl. No.: 17/606,159

(22) PCT Filed: Mar. 30, 2020

(86) PCT No.: PCT/DE2020/100258
§ 371 (c)(1),
(2) Date: Oct. 25, 2021

(87) PCT Pub. No.: WO2020/216404
PCT Pub. Date: Oct. 29, 2020

(65) Prior Publication Data
US 2022/0200410 A1    Jun. 23, 2022

(30) Foreign Application Priority Data

Apr. 26, 2019 (DE) .................... 10 2019 110 862.4
Aug. 6, 2019 (DE) .................... 10 2019 121 203.0

(51) Int. Cl.
*H02K 11/25* (2016.01)

(52) U.S. Cl.
CPC .................................. *H02K 11/25* (2016.01)

(58) Field of Classification Search
CPC ....... H02K 11/25; H02K 3/12; H02K 15/0421
See application file for complete search history.

(56) References Cited

U.S. PATENT DOCUMENTS

2020/0313316 A1 * 10/2020 Bhat ..................... H02K 3/50

FOREIGN PATENT DOCUMENTS

| CN | 201351706 Y | * 11/2009 | |
| CN | 104682627 A | 6/2015 | |
| CN | 107546924 A | 1/2018 | |
| DE | 19936218 A1 | * 2/2001 | ............... G01K 1/14 |
| DE | 102013201835 A1 | 8/2014 | |
| DE | 102014215916 A1 | 2/2016 | |
| DE | 102015203435 A1 | 9/2016 | |
| DE | 102016213790 A1 | 2/2018 | |

(Continued)

OTHER PUBLICATIONS

English translation of JP-2003092858-A (Year: 2003).*
English translation of CN-201351706-Y (Year: 2009).*

*Primary Examiner* — Tulsidas C Patel
*Assistant Examiner* — Joshua Kiel M Rodriguez
(74) *Attorney, Agent, or Firm* — Volpe Koenig

(57) ABSTRACT

An electric machine includes a stator having a winding, and at least one temperature sensor for detecting the temperature in the region of the winding. The temperature sensor is arranged on an elongate support that is elastic at least in the region of the temperature sensor. The support is placed in an elongate recess which is open to at least one of the sides of the windings and the temperature sensor is pressed into thermal contact with the winding by the support.

14 Claims, 3 Drawing Sheets

(56) References Cited

FOREIGN PATENT DOCUMENTS

| DE | 102018206985 A1 | 2/2019 |
|----|-----------------|--------|
| FR | 3037737 A1 | 12/2016 |
| JP | 2003092858 A | 3/2003 |
| WO | 2016207537 A1 | 12/2016 |

\* cited by examiner

ELECTRIC MACHINE WITH WINDING TEMPERATURE SENSOR

CROSS-REFERENCE TO RELATED APPLICATIONS

This application is the U.S. National Phase of PCT Appln. No. PCT/DE2020/100258 filed Mar. 30, 2020, which claims priority to DE 102019110862.4 filed Apr. 26, 2019 and DE 102019121203.0 filed Aug. 6, 2019, the entire disclosures of which are incorporated by reference herein.

TECHNICAL FIELD

The disclosure relates to an electric machine comprising a stator having a winding and at least one temperature sensor for detecting the temperature in the region of the winding.

BACKGROUND

Electric machines comprise a rotor and a stator and are used in different areas of application. The use of electric machines for electric hybrid vehicles and electric vehicles, or for hub drives is to be mentioned only as an example. If such an electric machine is used as a drive machine, it is usually designed as an internal rotor, i.e., the stator surrounds the internal rotor. A moving magnetic field is generated via the stator, which causes the rotor to rotate. For this purpose, the stator has a winding consisting of a plurality of conductors, wherein the conductors are assigned to one or usually more than phase. The winding is guided around the stator teeth in a known manner.

Not only the number of phases is included in the design of the winding geometry, but also the number of wires per phase as well as the number of wires per slot within the stator toothing and the number of pole pairs. This variety of conductors and winding parameters creates a complex network of conductors that is built up using different winding technologies. Examples include hairpin or bar wave windings. Here, the conductors are formed by means of rods bent into a U-shape, which are put together to form a winding basket. The conductors are laid on a plurality of radial levels, with the conductors moving from level to level, so to speak. To form these quasi meandering, circumferential conductors, they are to be connected accordingly at their ends, which is usually done by welding the conductor ends that are adjacent to one another. The conductor ends converge at one point or on one side of the winding in the form of the so-called star, where they are connected to one another. In this region, the connection of the individual phases to an external power supply, i.e., a power connection that is used to generate the magnetic field, is performed.

While the electric machine is in operation, the temperature of individual components must be monitored, for which appropriate temperature sensors are used. One region in which the temperature is to be recorded is that of the winding, since the region of the winding is often one of the hottest points of the stator of the electric machine at which a temperature sensor can be installed. The hottest point of the stator is in the region of the hairpin or bar wave winding, precisely in the axial center of the laminated core. However, since this point cannot be reached to integrate a temperature sensor, the outer region of the winding is selected. For this purpose, the temperature sensor is installed inside the stator, which means that it usually must be installed at an early stage of the production process. In order to record the temperature in the winding region as precisely as possible, it is desirable to attach the temperature sensor as close as possible to or on the winding or winding head, since media flows in the interior, for example water, air, oil, etc., can affect the temperature measurement and therefore as the distance from the temperature sensor to the winding or the winding head increases, the accuracy of the measurement decreases. The arrangement of the temperature sensor, in particular on a particularly tightly-wound or compactly-wound winding, such as a hairpin or a bar wave winding, is particularly complicated.

SUMMARY

The object of the disclosure is to specify an electric machine that is improved in comparison.

To achieve this object in an electric machine of the type mentioned above, in accordance with the disclosure it is provided that the temperature sensor is arranged on an elongate support that is elastic at least in the region of the temperature sensor, wherein the support is placed in an elongate recess which is open to at least one of the sides of the winding and the temperature sensor is pressed into thermal contact with the winding by the support.

The electric machine according to the disclosure provides the integration of the temperature sensor, for example, a PTC or NTC sensor, virtually within the interior of the winding or a partial winding of the stator winding, in that the temperature sensor is placed into an elongate, open recess within the winding by means of a support on which it is arranged. This recess, which runs, for example, from the exterior of the winding to the interior of the winding and preferably extends close to or as far as the rotor region, enables reliable positioning that is reproducible with regard to the radial and axial position, and thus the integration of the temperature sensor deep within the winding and thus in the region of temperature generation. The elongate support is designed in such a way that it has a certain elasticity and flexibility at least in the region in which the temperature sensor is arranged on it, so that the temperature sensor is pressed into thermal contact with the winding via the support in the insertion position, therefore it is spring-loaded against the winding. Furthermore, the support is designed in such a way that it has an insulating effect on the laminated core, so that the temperature of the winding surface and not of the laminated core is actually measured.

The assembly of the temperature sensor is very simple; it is only necessary to insert the support and the temperature sensor into the recess on the side of the winding. This allows the temperature sensor to be ideally positioned so that a very precise and reliable measurement is possible, especially as a very high level of heat transfer between the winding and the sensor is achieved due to the contact between the temperature sensor and the winding, so that undesired error influences and measured value deviations are reliably avoided. Because the sensor is integrated in the interior of the winding, the sensor is also protected.

The recess itself preferably runs radially and is open at least to the exterior of the winding. This means that the support and the temperature sensor can easily be inserted into the winding from the outside.

According to a further extension of the disclosure, it is provided that the cross-sectional geometry of the support essentially corresponds to the cross-sectional geometry of the recess. This means that the shape of the support is adapted to the recess, so that optimal positioning results when it is inserted. The geometry of the recess is known due to the known winding design, so that the support can be designed accordingly. Because of this shape adaptation, an ideal pressing of the temperature sensor onto the winding or the winding conductor via the elastic or flexible support is possible.

It is also advantageous if one or more stops are provided on the support to limit the insertion movement when it is placed into the recess. Precise positioning is possible via the stop or stops, as the support can only be pushed in as far as the stop and for this purpose, it is ensured that the support is always positioned in the recess in the same way.

As described, the support is used to press or spring-load the temperature sensor against the winding. For this purpose, it is expedient if the support is slotted in the region of the leading end, forming two spring arms, wherein the temperature sensor is positioned in the region of a spring arm. A defined elastic region is thus formed on the support, wherein the temperature sensor is positioned in precisely this region. The front edge of one or both spring arms is preferably provided with a bevel, which enables easy insertion and also good elasticity, since this bevel, which can be formed on a corresponding projection, ensures that the support slides cleanly along the recess bounding the conductor. On the other hand, the spring arms are pressed slightly against each other and a corresponding contact pressure is built up. In addition, the recess is adapted in such a way that the support engages in a snap action, so to speak, at the end position with the winding, thus preventing the support from becoming detached again during operation.

The support itself is, at least in the region in which the temperature sensor is arranged, or is completely made of a plastic, wherein different plastics can be used, but preferably an elastomer or silicone. The material or the plastic is to be selected in each case in such a way that it is suitable for spring-loading the temperature sensor against the winding. In addition to an elastomer, an expansion material or the like can also be used. All that is required is sufficient flexibility or elasticity and temperature resistance.

The temperature sensor itself is expediently arranged on an elongate sensor carrier and connected via connecting cables to a cable connected to the sensor carrier. The sensor carrier, for example a narrow plate, serves as a stable sensor carrier on which the sensor is also in contact with the sensor cable. A shrink tube is preferably pulled over the sensor carrier with the sensor and connecting cables attached in order to protect the arrangement. The use of such a stable sensor carrier is advantageous in that, on the one hand, it enables a simple arrangement of the temperature sensor on the support; on the other hand, this can also be used for assembly in such a way that the support is first pushed into the recess, after which the sensor carrier together with the sensor is pushed onto the support and thus pushed into the recess. This is because there is a sufficiently stable arrangement over the sensor carrier that makes this possible.

The support itself can have an elongate, groove-like receiving section into which the sensor carrier is placed. An ideal position of the sensor on the sensor carrier is specified by this receiving section. This is expedient both for the pre-assembly of the sensor carrier on the support, i.e., when both are pushed into the recess together, but also when first the support is pushed in and subsequently the sensor carrier, since this receiving section in turn defines the movement of the sensor carrier and specifies the end position.

For this purpose, the receiving section is preferably open on one side, enabling the sensor carrier to be inserted after the support has been placed in the recess, so that the insertion movement of the sensor carrier is also limited.

In the case of such a two-stage assembly, it is conceivable to first insert the support and fix it in the recess, for example by means of an adhesive, and only then insert the sensor carrier, wherein the sliding motion along the receiving section up to the stop precisely positions the sensor carrier and thus the sensor.

Finally, it is advantageous if the support, including the temperature sensor, is fixed in the recess by means of a thermally-conductive adhesive, regardless of how the assembly is actually carried out (one-step or two-step). This means that after the final assembly, the support together with the temperature sensor is applied with an adhesive and fixed on the side of the winding and is thus finally fixed in its end position.

BRIEF DESCRIPTION OF THE DRAWINGS

The disclosure is explained below on the basis of exemplary embodiments with reference to the drawings. The drawings are schematic representations, wherein.

DETAILED DESCRIPTION

Figure 1:
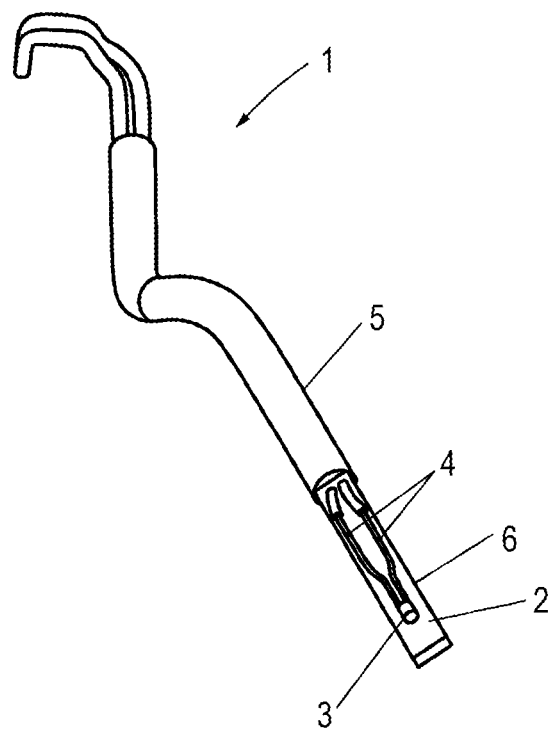
FIG. 1 shows a perspective view of a temperature sensor arranged on a sensor carrier, together with connecting cables and sensor cables.

FIG. 1 shows a sensor arrangement 1, comprising a sensor carrier 2 on which a temperature sensor 3, for example, a PTC or an NTC sensor, is arranged, e.g., fixed with an adhesive. The temperature sensor 3 is connected to corresponding cables of a sensor cable 5 via connecting cables 4. A shrink tube 6 is pulled over the sensor carrier 2 together with the temperature sensor 3 and the connecting cables 4 for protection.

It can be seen that the sensor carrier 2 has an elongate rectangular shape. It is designed as a narrow, thin plate, but at the same time sufficiently stable to be arranged on a support, by means of which it is positioned in a corresponding recess of a winding of a stator.

Figure 2:
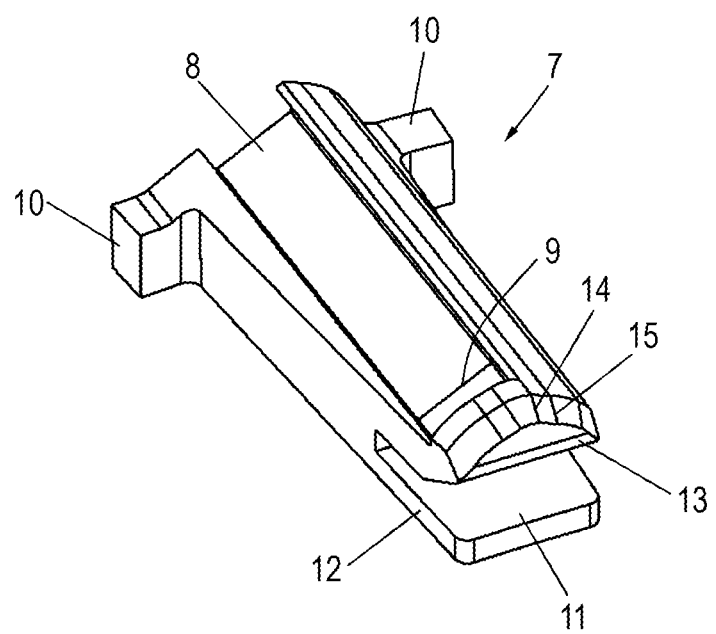
FIG. 2 shows a perspective view of a support used to hold the temperature sensor.

A perspective view of such a support 7 is shown in FIG. 2. The support 7 consists of a flexible or elastic material, preferably a plastic and in particular an elastomer, wherein other plastics can also be used so long as they are sufficiently flexible or elastic and, in particular, temperature resistant. The support 7 has a specific cross-sectional shape or geometry which essentially corresponds to the geometry of the recess in which it is placed or is based. Overall, it is designed to be elongate and has a groove-like receiving section 8 on its upper side, which is open on one side and is delimited axially by a stop 9. The elongate sensor carrier 2 is inserted into this receiving section during assembly, as will be discussed further below.

At the rear end of the support 7 in relation to the direction of insertion, two stops 10 are provided which limit the insertion movement into the winding recess, i.e., run against the winding during assembly and thus serve for reproducible, precise positioning.

At the front, the leading end of the support 7 is slotted over a slot 11 so that two spring arms 12, 13 are formed, wherein the spring arm 13 has an upwardly extending projection 14 which is provided with a leading bevel 15. The spring arms 12, 13 can spring slightly towards one another, which makes it possible to spring-load the temperature sensor 3, after being arranged on the support 7, in the direction of the adjacent winding or the adjacent conductor or to press it against same.

Figure 3:
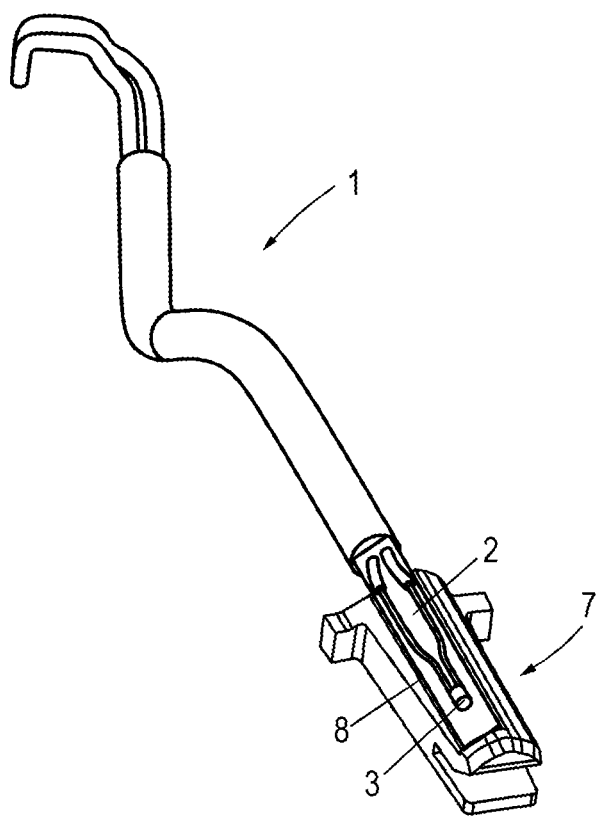
FIG. 3 shows the support including the sensor carrier with the temperature sensor.

FIG. 3 shows the complete temperature measuring device including the temperature sensor arrangement 1 and the support 7. It can be seen that the sensor carrier 2 together with the temperature sensor 3 is received in the groove-like receiving section 8 and pushed as far as the stop 9. The width of the receiving section 8 is dimensioned such that it essentially corresponds to the width of the sensor of the support and is consequently guided and positioned precisely. This width can also be made minimally smaller in order to enable the temperature sensor to be clamped.

Placing can be performed in two different ways. On the one hand, it is possible, before the support 7 is placed in the recess of the winding, to attach the sensor carrier and thus the temperature sensor 3 on the support 7 and to fix it there, for example, by means of a—preferably fixing—adhesive. Now, for example, the thermally-conductive adhesive can be applied to the sensor carrier. The entire device according to FIG. 3 can then be inserted in the groove on the side of the winding.

Alternatively, it is also conceivable, sometimes also preferred, to first push only the support 7 into the recess on the side of the winding and to position it and only then, if necessary after prior adhesive fixing of the support 7 in the recess, insert the sensor carrier 2 together with the temperature sensor 3 into the groove-like receiving section 8, which is open to the exterior of the winding. This is easily possible as, on the one hand, the sensor carrier 2, for example a ceramic plate or plastic plate, is sufficiently stable and this sliding movement is possible, and on the other hand because the insertion movement is also precisely guided by the geometry of the receiving section 8. After insertion, the final configuration shown in FIG. 3 is again obtained.

Figure 4:
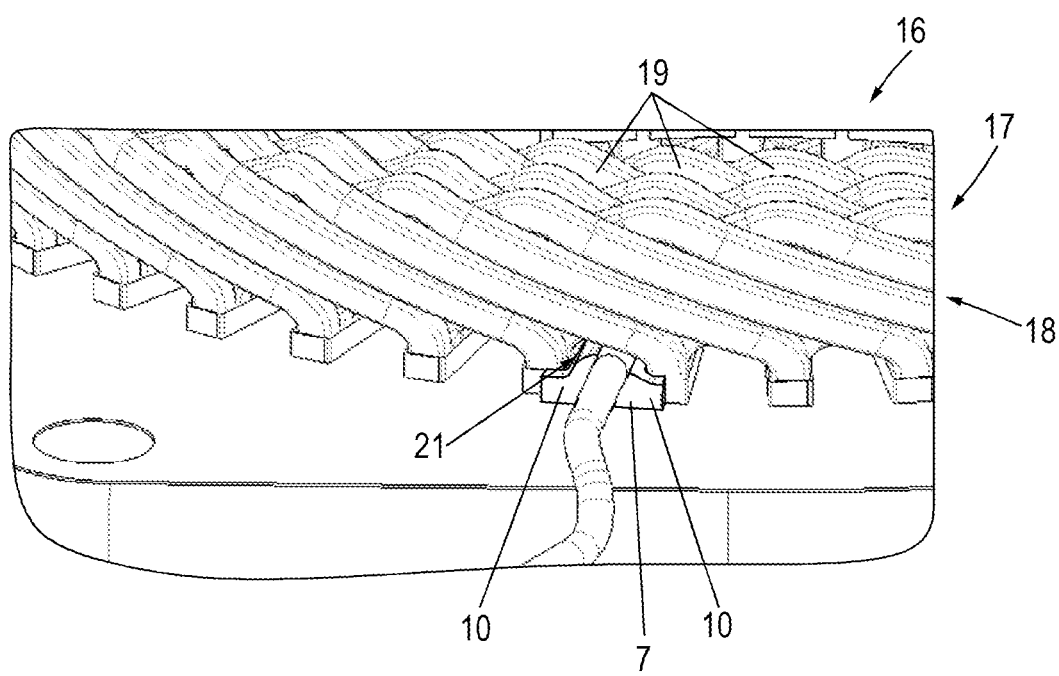
FIG. 4 shows a partial view of an electric machine according to the disclosure with a view from the exterior of the winding head with the support inserted, including the temperature sensor.
Figure 5:
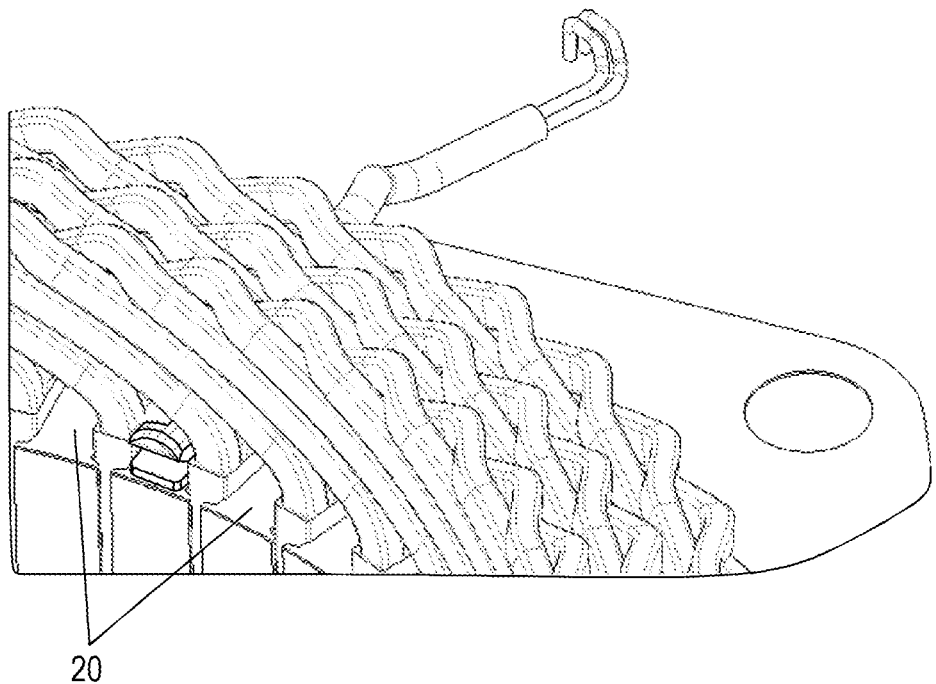
FIG. 5 shows the arrangement from FIG. 4 with a view of the inside of the winding head.
Figure 6:
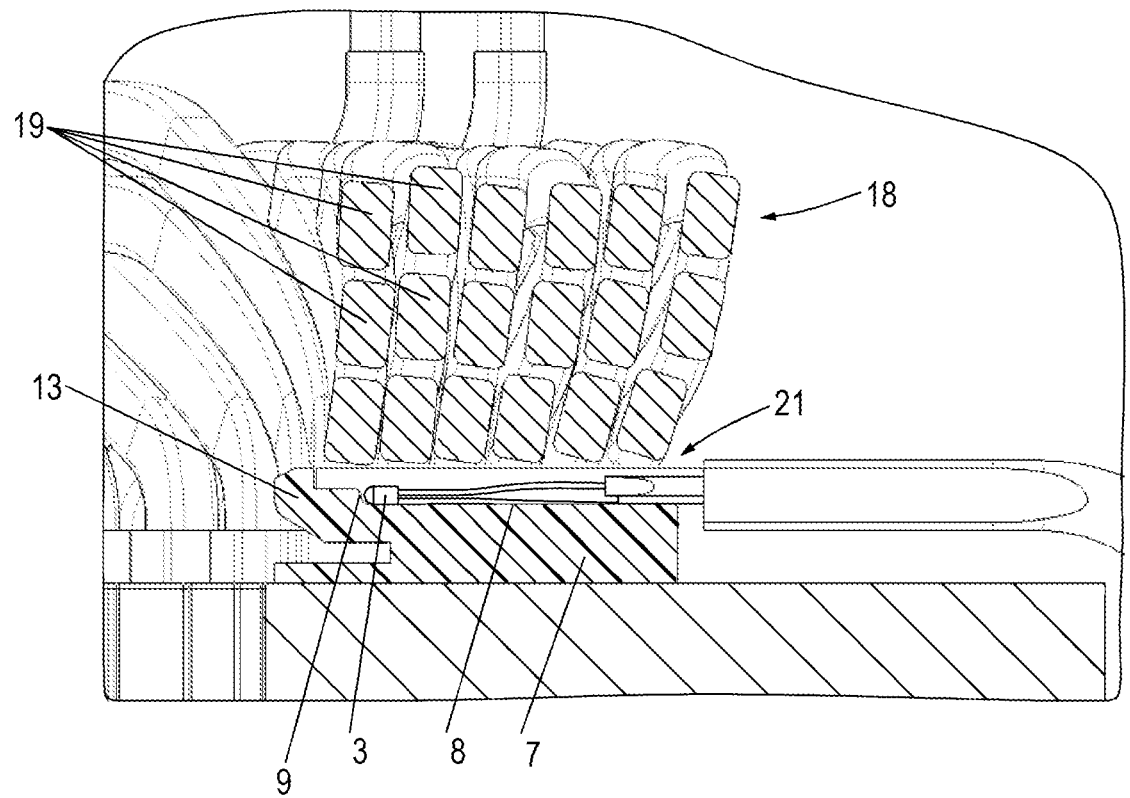
FIG. 6 shows a cross-sectional view through the winding head and the support together with the temperature sensor.

FIGS. 4-6 show, in the form of various partial views, a section of an electric machine 16, showing part of the stator 17 with its winding 18, which consists of a large number of individual conductors 19, as the figures clearly show. The winding is designed as a hairpin or bar wave winding, while the individual, U-shaped, clamp-like conductors 19 are correspondingly assembled to form a winding head and connected to one another in a known manner, wherein the winding as a whole is wound around corresponding stator teeth 20.

A recess 21 is formed within the winding 18 which, in the example shown, is open to both the outer side of the winding and the inner side of the winding. The elastic, flexible support 7 is now inserted into this recess 21, either together with the sensor carrier 2 already attached to it, or without the sensor carrier 2, which is then inserted into the groove-like receiving section 8 in a second assembly step. The insertion movement of the support 7 is limited by the stops 10, and the insertion movement of the sensor carrier 2 along the receiving section 8 is limited by the stop 9.

In the assembly position, see in particular FIG. 6, the temperature sensor 3 is in the region of the front end of the support 7, wherein this region with the elastic spring arm 13 is flexible and resilient, so that the temperature sensor 3, or the sensor carrier 2 and with it the temperature sensor 3, is pressed in the direction of the winding 18 or the adjacent conductor 19 and brought into thermal contact therewith. The spring arm 13 also has the task of facilitating the integration of the support 7 so that it is guided cleanly through the winding, which is designed as a hairpin or bar wave winding. Although the sensor carrier 2 is optionally covered with the shrink tube, there is, despite this, a defined thermal contact between the temperature sensor 3 and the winding 18 or conductor 19. The dimensions of the support 7 are, of course, such that there is a certain overlap with the recess geometry, so that it is ensured that a certain contact pressure is always built up and the sensor carrier 2 or the temperature sensor 3 are pressed against the wire winding.

Then, if not already carried out in part, the temperature measuring device is fixed inside the winding 18 using a corresponding adhesive, of course a thermally conductive adhesive, and a final fixation is carried out by applying the adhesive to the winding in a trickling manner. This is how the remaining stage of the form fit between the support 7 and thus also the sensor carrier 2 and the winding 18 is achieved.

In the example shown, the temperature sensor is integrated in the region of the winding head, i.e., in a region where the windings remain constantly horizontal, which is why the elastic support 7 can easily compensate for the necessary tolerance differences and spring-load the temperature sensor axially against the winding 18. Due to being enclosed by a shrink tube 6, but also due to the design of the upper projection 14 and the deepened reception of the sensor carrier 2 and thus the temperature sensor 3 in the receiving section 8, any medium flow (water, air, oil, etc.) is prevented from being able to reach the temperature sensor.

LIST OF REFERENCE NUMBERS

1 Sensor arrangement
2 Sensor carrier
3 Temperature sensor
4 Connecting cable
5 Sensor cables
6 Shrink tube
7 Support
8 Receiving section
9 Stop
10 Stop
11 Slot
12 Spring arm
13 Spring arm
14 Projection
15 Bevel
16 Machine
17 Stator
18 Winding
19 Conductor
20 Stator tooth
21 Recess

The invention claimed is:

1. An electric machine comprising:
a stator having a winding and at least one temperature sensor for detecting a temperature in a region of the winding,
wherein the temperature sensor is arranged on an elongate support that is elastic at least in a region of the temperature sensor, wherein the support is slotted in a region of a leading end to form an upper spring arm and a lower spring arm, the temperature sensor is arranged on at least a portion of an outwardly facing surface of the upper spring arm, and wherein the support is placed in an elongate recess which is open to at least one side of the winding and the temperature sensor is pressed into thermal contact with the winding by the upper spring arm of the support.

2. The electric machine according to claim 1, wherein the recess runs radially and is open to at least an exterior of the winding.

3. The electric machine according to claim 1, wherein a cross-sectional geometry of the support corresponds to a cross-sectional geometry of the recess.

4. The electric machine according to claim 1, wherein one or more stops are provided on the support to limit an insertion movement when the temperature sensor is inserted in the recess.

5. The electric machine according to claim 1, wherein the support is, at least in the region in which the temperature sensor is arranged made of a plastic.

6. The electric machine according to claim 1, wherein the temperature sensor is arranged on an elongate sensor carrier and is connected via connecting cables to a cable connected to the sensor carrier.

7. The electric machine according to claim 6, wherein the support has an elongate, groove-like receiving section into which the sensor carrier is positioned.

8. The electric machine according to claim 7, wherein the receiving section is open on one side, allowing the sensor carrier to be inserted after the support has been placed into the recess.

9. The electric machine according to claim 1, wherein the support, together with the temperature sensor, is fixed in the recess by an adhesive.

10. The electric machine according to claim 1, further comprising a shrink tube pulled over the temperature sensor for protection thereof.

11. An electric machine comprising:
a stator having a winding;
at least one temperature sensor configured for detecting a temperature of the winding; and
an elongate support comprising:
a groove-like receiving section on an upper side that is open on one end and includes a stop on the other end, wherein the temperature sensor is received in the receiving section via the open end and abuts the stop;
a leading end inserted into a recess of the winding, wherein the temperature sensor is pressed into thermal contact with the winding by the support; and
a first spring arm and a second spring arm formed in the leading end defining a slot therebetween, wherein the first spring arm and the second spring arm are configured to be spring loaded and force the temperature sensor away from the slot to press against the winding.

12. The electric machine according to claim 11, wherein the first spring arm or the second spring arm includes an upwardly extending projection which is provided with a leading bevel.

13. The electric machine according to claim 11, wherein the groove-like receiving section is formed at least partially on the first spring arm or the second spring arm.

14. The electric machine according to claim 11, wherein two stops are provided on a rear end of the support, opposite the leading end, and configured to limit an insertion movement of the support into the recess.

* * * * *